United States Patent [19]

Hamilton

[11] 4,309,133
[45] Jan. 5, 1982

[54] ULTRA-ADJUST BORING AND MILLING SYSTEM

[76] Inventor: Martin N. Hamilton, R.D. #4, Middle Rd., Meadville, Pa. 16335

[21] Appl. No.: 139,545

[22] Filed: Apr. 11, 1980

[51] Int. Cl.³ .................... B23B 29/02; B23B 29/034
[52] U.S. Cl. ................................. 408/183; 408/157; 407/45
[58] Field of Search ............... 408/181, 182, 183, 184, 408/185, 157, 153; 407/45

[56] References Cited

U.S. PATENT DOCUMENTS 3,724,965  4/1973  Green ................................. 408/183

FOREIGN PATENT DOCUMENTS 643317  9/1950  United Kingdom ............... 408/183

Primary Examiner—Z. R. Bilinsky

[57] ABSTRACT

A tool having a shank, cartridges on the shank positioned by a screw having two externally threaded parts which engage two internally threaded sleeves which in turn engage threaded openings in the cartridges. One of the threaded openings being right-hand thread and the other opening being left-hand thread. Thus, the cartridges can be moved laterally together or individually by rotating the screw or any of the sleeves.

5 Claims, 4 Drawing Figures

ULTRA-ADJUST BORING AND MILLING SYSTEM

GENERAL DESCRIPTION OF THE INVENTION

A cutting tool is disclosed having a cylindrical shank with a laterally disposed slot in which two insert cartridges are slidably supported. Each said insert cartridge has an internally threaded bore therein, said internally threaded bores receive an internally threaded sleeve which is also externally threaded. The external threads on the sleeves engage the internal threads on said cartridges. One of the threaded bore in one sleeve is a left-hand thread and the other said bore having a right-hand thread. A screw having a first part and a second part integrally connected together, the first part threadably engages the internal threads on the first sleeve and the second screw part threadably engaging the internal threads on the second sleeve. Thus, the cartridges can be moved away from one another by rotating the screw and the cartridges may be adjusted in or out individually by adjusting the sleeves.

OBJECTS OF THE INVENTION

It is an object of the invention to provide a precision adjustable cutting tool having adjustable inserts which can be adjusted toward and away from each other by rotating the screw in a first or a second direction and the inserts can be individually adjusted toward and away from each other by rotating individual screws.

Another object of the invention is to provide a cutting tool support with cutting tools that are individually adjustable wherein said cutting tool support is simple in construction, economical to manufacture and simple and efficient to use.

Another object of the invention is to provide an improved cutting tool.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
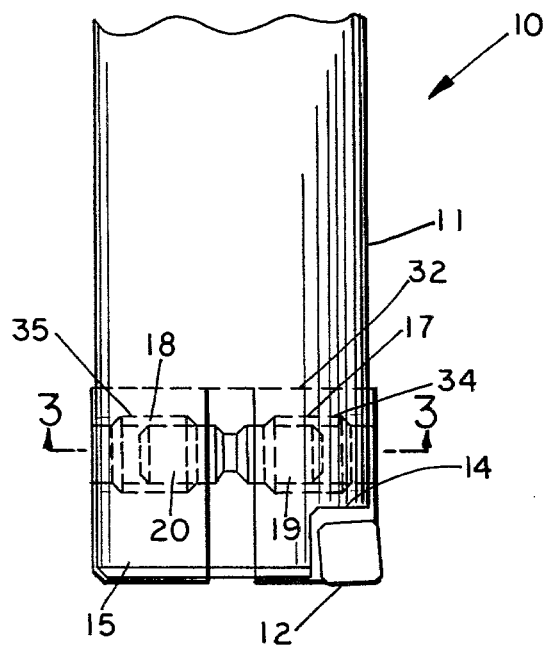
FIG. 1 is a view of a tool according to the invention having the upper end removed for better understanding.
Figure 2:
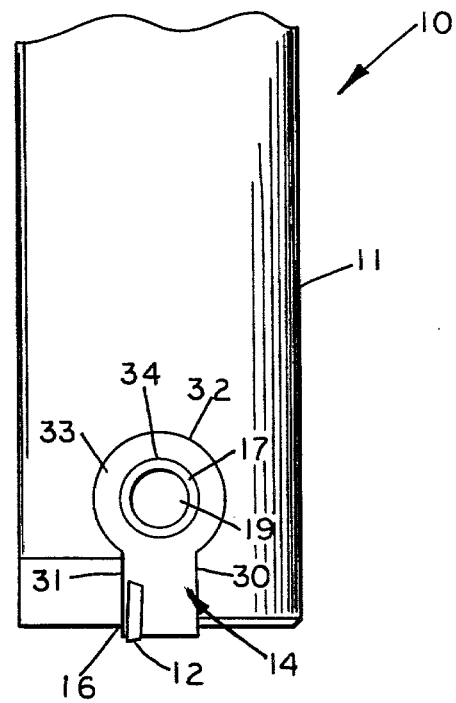
FIG. 2 is a view similar to FIG. 1 rotated at right angles to the view shown in FIG. 1.
Figure 3:
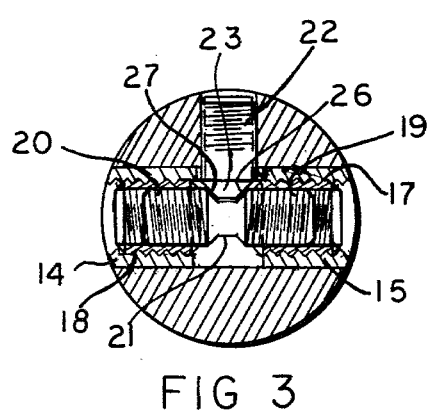
FIG. 3 is a longitudinal cross-sectional view taken on Line 3—3 of FIG. 1.
Figure 4:
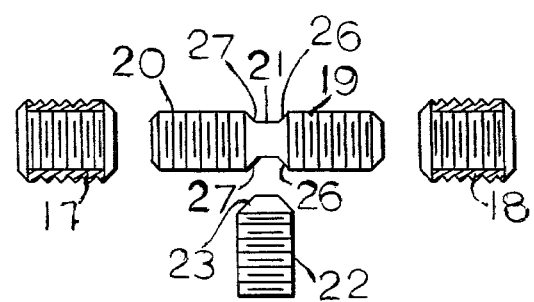
FIG. 4 is an exposed view showing the screws and sleeves according to the invention.

Now, with more particular reference to the drawing, the tool indicated generally at 10 attached to a cylindrical shank or body 11 with a diametrically extending slot 16 extending across the shank from one side thereof to the other. The slot has two parallel sides 30 and 31 which receives the rectangular part of the cartridges 14 and 15. Each cartridge carries a cutting insert 12. The slot has a cylindrical part 32, which receives the cylindrical portion 33 of the cartridge 16 and the cylindrical part 32 of the slot at the opposite end receives the cylindrical part of the cartridge 15.

Each cartridge has an internally threaded bore 34 and 35 which threadably receives the threaded sleeve 17 and 18. The threaded sleeves are externally threaded and one end having a left hand thread and the other a right hand thread and internally threaded to receive the first screw part 19 and the second screw part 20 respectively. The threads on the screw 19 are of different hand than the threads on the screw 20 so that the screw 19 which is integrally attached to the screw 20 by the intermediate member 21 restrains the screw parts 19 and 20 to rotate together and when they rotate in one direction they pull the sleeves 17 and 18 and the cartridges 14 and 15 towards one another and when they rotate in the opposite direction they push the cartridges 14 and 15 away from one another. Each cartridge 14 and 15 can be moved independent of the other by rotating the sleeves 17 or 18 to move the cartridge 14 or 15.

The inner end of the screw parts 19 and 20 have frusto-conical ends 26 and 27 respectively. These frusto-conical ends engage the frusto-conical end 23 on the screw 22.

The screws 19 and 20 can be locked in lateral position by tightening the screw 22 to bring its frusto-conical end 23 into engagement with ends 26 and 27 of the screw parts 19 and 20. When the screw parts 19 and 20 are held in position the cartridges 14 and 15 can be moved independent of each other radially of the shank by loosening screw 22 and then rotating either of sleeves 17 or 18 to adjust their position then retightening screw 27 to clamp it. The cartridges can also be moved together from side to side by loosening the screw 22 and rotating the screw parts 19 and 20 one way or the other, thus moving the sleeves 17 and 18 toward or away from one another and with them moving the cartridges 14 and 15 toward or away from one another.

The screw parts 19 and 20 can be, for example, ⅜" in diameter and have 24 threads per inch. The internal threads on the sleeves 17 and 18 will, of course, be of the same diameter and thread size and the same hand as the external threads on the screw parts 19 and 20.

The external threads on sleeves 17 and 18 will be, for example, ½" in diameter and have 20 threads per inch, one of them right hand and the other left hand. The sleeve 17 will have right hand threads and the screw 18 will have left hand threads both inside and out and the sleeve 17 have left hand threads both inside and outside.

The lock screw 22 can have any suitable number of threads. Thus, by rotating the screw parts 19 and 20 through the intermediate member 21 the cartridges are moved together one direction or the other depending on which direction they were rotated. By rotating the sleeves 17 or 18 the cartridges will be adjusted toward or away from one another and independent of each other.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A boring tool comprising a shank, said shank having a transversally disposed slot therein, a first cartridge and a second cartridge slidably supported in said slot, said first cartridge having a bore with a left-hand thread therein, said second cartridge having a bore with a right-hand thread therein, a first sleeve threadably received in said first cartridge and a second sleeve threadably received in said second cartridge, a screw having a first left hand threaded part engaging internal thread on said first sleeve and second part on said screw threadably engaging an internal thread on the second sleeve, said screw parts being fixed together whereby the cartridges can be moved laterally individually toward and away from each other by rotating said screw or by rotating either said sleeve and a locking screw extending through said shank engaging said screw for locking said screw in position.

2. The tool recited in claim 1 wherein each said cartridge has a cutting insert fixed thereto.

3. The tool recited in claim 1 wherein said laterally extending slot has a cylindrical part and two flat planar parts disposed generally parallel to the longitudinal axis of said shank, each said cartridge has a cylindrical part slidably received in said cylindrical part of said slot and two flat planar parts slidably engaging said planar parts of said cartridges defining said slot.

4. The tool recited in claim 3 wherein said first screw part and said second screw part are connected together by an integral reduced diameter portion and each side of said reduced diameter portion is connected to said threaded part by a tapered portion and said locking screw has a frusto-conical end engaging said reduced size parts.

5. The tool recited in claim 3 wherein said sleeve is threadably received in a threaded bore disposed concentric to said cylindrical part.

* * * * *